C. A. LARSON.
SANITARY MILK PAIL.
APPLICATION FILED MAR. 31, 1916.

1,245,932.

Patented Nov. 6, 1917.

Witnesses
Frederick W. Ely
[signature]

Inventor
Charles A. Larson.
By Victor J. Evans
Attorney

UNITED STATES PATENT OFFICE.

CHARLES A. LARSON, OF LEMONT, ILLINOIS.

SANITARY MILK-PAIL.

1,245,932.  Specification of Letters Patent.  Patented Nov. 6, 1917.

Application filed March 31, 1916. Serial No. 88,060.

*To all whom it may concern:*

Be it known that I, CHARLES A. LARSON, a citizen of the United States, residing at Lemont, in the county of Cook and State of Illinois, have invented new and useful Improvements in Sanitary Milk-Pails, of which the following is a specification.

This invention is an improved sanitary milk pail, embodying, in connection with a milk pail, a strainer comprising a funnel element for insertion in the mouth of the pail and a strainer element detachably fitted in the body of the funnel and arranged to prevent particles of dirt from passing with the milk through the funnel and into the pail and causing such dirt particles to be collected and to settle in the body of the funnel around the upper end of the spout or neck thereof, the object of the invention being to provide an improved device of this character which is simple and cheap in construction, and the parts of which may be readily separated and cleaned.

The invention consists in the features of construction, combination, and arrangement of devices, hereinafter described and claimed.

In the accompanying drawings:—

Figure 1:
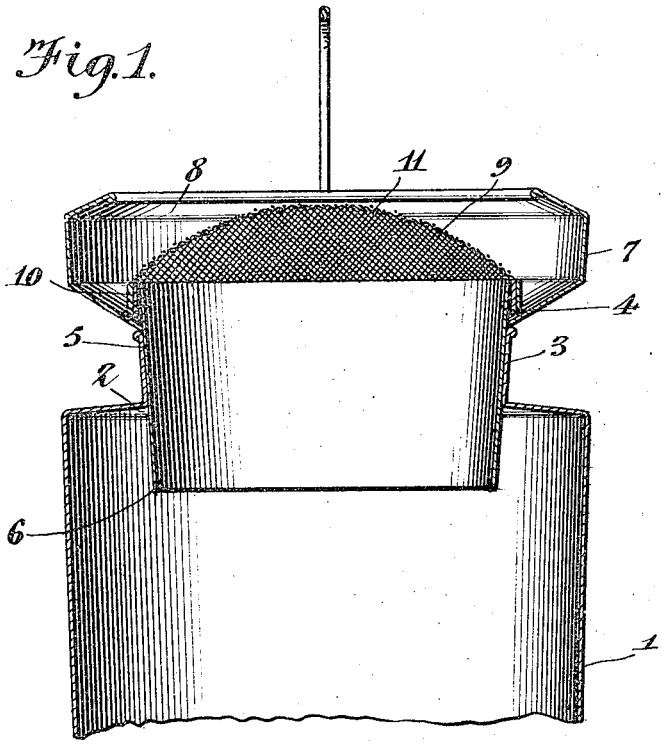
Figure 1 is a vertical sectional view of the upper portion of a milk pail constructed and arranged and provided with a funnel and strainer in accordance with my invention.
Figure 2:
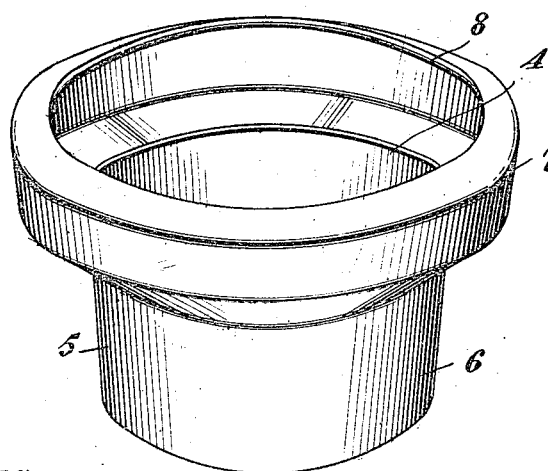
Figs. 2 and 3 are detail perspective views of the funnel and strainer respectively.
Figure 3:
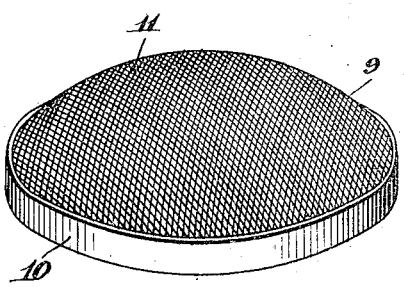

In accordance with my invention, the milk pail 1, which may be made of any suitable material and which may be of any suitable size and shape is provided in its upper side with a mouth 2 around which is a collar 3.

I also provide a funnel element which embodies a neck or spout 4, the lower end of which is adapted to be inserted in the mouth of the pail and the upper end of which extends a slight distance above the wall 5 of the funnel. This body is of greater diameter than the neck and its bottom 6 is of inverted frusto-conical form. The wall also has a frusto-conical upper portion 7, forming an opening 8 which also is of greater diameter than the neck of the funnel.

Associated with the funnel is a strainer 9 which embodies a ring 10 adapted to fit around the projecting upper end of the funnel neck or spout 4 and also embodying a substantially semi-spherical or dome-shaped strainer fabric 11, which in practice is preferably brass or copper cloth.

When the funnel is thus applied to the pail and the strainer is thus arranged in and applied to the upper end of the funnel, and the milk or other liquid is poured into the pail, through the funnel and strainer, the strainer owing to the dome-shape of its strainer cloth or fabric, not only separates the dirt particles from the milk, but causes the dirt particles to pass downwardly and outwardly over the strainer and to settle in the bottom of the body of the funnel, and around the upwardly extending end of the funnel neck or spout. Hence, the milk is effectively strained. The funnel may be readily detached from the pail and the strainer may be readily detached from the funnel, so that all the parts of the device may be easily washed and kept clean.

Having described the invention, what is claimed is:

The combination with a milk pail having a neck portion, of a hollow tubular member adapted to be partially fitted within said neck portion, a funnel embodying a frusto conical portion projecting from said member an appreciable distance below the upper edge thereof and integrally secured thereto, said conical portion terminating substantially in a plane with the upper edge of the member, an annular vertically disposed wall extending from the upper edge of the conical portion, an inwardly extending inclined member forming a continuation of said wall, and defining a bowl of uniform dimension surrounding the upper edge of said tubular member, a substantially concavo-convex strainer covering said tubular member and wholly disposed beneath the inwardly extending inclined member of the vertical wall, and a ring secured to the edge of said strainer, and embracing the tubular member, whereby the strainer is held positioned with respect to the latter.

In testimony whereof I affix my signature in presence of two witnesses.

CHARLES A. LARSON.

Witnesses:
 OLAF ERIKSON,
 JOHN JOHNSON.

Copies of this patent may be obtained for five cents each, by addressing the "Commissioner of Patents, Washington, D. C."